United States Patent
Magee et al.

(10) Patent No.: US 9,557,766 B1
(45) Date of Patent: Jan. 31, 2017

(54) HIGH-SPEED SERIAL DATA INTERFACE FOR A PHYSICAL LAYER INTERFACE

(71) Applicant: Xilinx, Inc., San Jose, CA (US)

(72) Inventors: Terence Magee, San Francisco, CA (US); Nicholas J. Sawyer, Brax (FR)

(73) Assignee: XILINX, INC., San Jose, CA (US)

( * ) Notice: Subject to any disclaimer, the term of this patent is extended or adjusted under 35 U.S.C. 154(b) by 237 days.

(21) Appl. No.: 14/463,943

(22) Filed: Aug. 20, 2014

(51) Int. Cl.
| | |
|---|---|
| *G06F 1/12* | (2006.01) |
| *G06F 13/42* | (2006.01) |
| *G06F 13/36* | (2006.01) |
| *H04L 7/00* | (2006.01) |
| *H04J 3/06* | (2006.01) |

(52) U.S. Cl.
CPC ............ *G06F 1/12* (2013.01); *G06F 13/36* (2013.01); *H04J 3/06* (2013.01); *H04L 7/0041* (2013.01)

(58) Field of Classification Search
CPC ................................ H04L 7/0041; H04J 3/06
USPC ............................... 713/400, 401, 500, 600
See application file for complete search history.

(56) References Cited

U.S. PATENT DOCUMENTS

| | | | | |
|---|---|---|---|---|
| 5,506,956 A | * | 4/1996 | Cohen ................. | G06F 11/10 714/6.1 |
| 2005/0271123 A1 | * | 12/2005 | Fulghum ............ | H04B 7/0891 375/148 |
| 2011/0140742 A1 | * | 6/2011 | Chen .................. | H04L 25/0272 327/65 |

* cited by examiner

*Primary Examiner* — Michael J Brown
(74) *Attorney, Agent, or Firm* — W. Eric Webostad (57) ABSTRACT

In an apparatus relating generally to the communication of data, a first and a second receive path block are respectively coupled to receive a first and a second data stream. A clock signal source is coupled to provide at least one clock signal to each of the first and the second receive path block. A control block is coupled to receive a first output signal pair and a second output signal pair from the first and the second receive path block, respectively. The first output signal pair includes a first crossing signal and a first data signal. The second output signal pair includes a second crossing signal and a second data signal. The control block is configured to provide first and second delay adjustment signals respectively to the first and second receive path blocks, to adjust delays of the first and second data streams, respectively.

20 Claims, 8 Drawing Sheets

HIGH-SPEED SERIAL DATA INTERFACE FOR A PHYSICAL LAYER INTERFACE

TECHNICAL FIELD

The following description relates to integrated circuit devices ("ICs"). More particularly, the following description relates to a high-speed serial data interface for a physical layer interface of an IC.

BACKGROUND

Retrieval of data from a serial bit stream in a physical layer interface ("PHY") of a networking system, such as a Physical Medium Access ("PMA") layer of Gigabit Ethernet or PCIe, may be challenging due to a frequency difference between two oscillators, namely an oscillator associated with a transmitter to control the frequency of source data transmitted and an oscillator associated with a receiver used for data acquisition. Due to a relative difference between frequencies of such remote and local oscillators, conventionally local clocking may not be used to directly sample a received serial bit stream.

Instead, encoding may be added to a transmitted serial bit stream to guarantee a minimum toggle rate of such source data, and a clock may thus be recovered from such data transitions, namely clock data recovery ("CDR"), that is frequency locked to such transmitted data stream. While a recovered clock may be used to sample received data to pass such sampled data through buffering to a local clock domain, CDR is conventionally expensive in terms of both power consumption and hardware area used. Overhead associated with CDR conventionally is excessive for use with lower data rates, such as for Gigabit Ethernet (e.g., 1.25 gigabits-per-second ("gbps")) and PCIe 1.x (e.g., 2.5 gbps). Rather than CDR, in other instances, incrementally phase delayed versions of a local clock have been used to oversample a received data bitstream, and a simple majority rules algorithm has been used to extract data from such oversampled data. However, conventionally cost effective oversampling can be frequency limited due to having to tightly control a phase difference between two clocks. Jitter and phase error on clock signals may significantly contract a system's timing margin.

Hence, it would be desirable and useful to provide data retrieval from a serial bit stream that overcomes one or more of the above-described limitations associated with CDR or oversampling.

SUMMARY

An apparatus relates generally to the communication of data. In such an apparatus, a first receive path block is coupled to receive a first data stream. A second receive path block is coupled to receive a second data stream associated with the first data stream. A clock signal source is coupled to provide at least one clock signal to each of the first receive path block and the second receive path block. A control block is coupled to receive a first output signal pair from the first receive path block and a second output signal pair from the second receive path block. The first output signal pair includes a first crossing signal and a first data signal. The second output signal pair includes a second crossing signal and a second data signal. The control block is configured to provide a first delay adjustment signal to the first receive path block to adjust a first delay of the first data stream, and further configured to provide a second delay adjustment signal to the second receive path block to adjust a second delay of the second data stream.

A method relates general to the communication of data. In such a method, there is first updating of a first data eye adjustable delay for a first data stream provided to a first receive data path. There is second updating of a second data eye adjustable delay for a second data stream provided to a second receive data path. In this method, the first updating and the second updating respectively adjust a first delay of the first data stream and a second delay of the second data stream with respect to at least one clock signal. A first data output of the first receive data path is used as a live output, and a second data output of the second receive data path is used as a monitor output.

A system relates generally to the communication of data. Such a system includes a plurality of input blocks of an integrated circuit device. A plurality of receive path blocks are respectively coupled to the plurality of input blocks. The plurality of receive path blocks are of a physical layer interface. Pairs of receive path blocks of the plurality of receive path blocks are coupled to receive differential data inputs. Either a first data stream or a second data stream of a differential data input of the differential data inputs is inverted. The first data stream is provided to a first receive path block of a pair of the pairs of receive path blocks. The second data stream is provided to a second receive path block of the pair of the pairs of receive path blocks. A clock signal source is coupled to provide at least one clock signal to each of the first receive path block and the second receive path block. A control block is coupled to receive a first output signal pair from the first receive path block and a second output signal pair from the second receive path block. The first output signal pair includes a first crossing signal and a first data signal. The second output signal pair includes a second crossing signal and a second data signal. The control block is configured to provide a first delay adjustment signal to the first receive path block to adjust a first delay of the first data stream, and further configured to provide a second delay adjustment signal to the second receive path block to adjust a second delay of the second data stream.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 3-1 and 3-2 are respective signal diagrams depicting exemplary signal timings.

FIGS. 4-1 and 4-2 are flow diagrams depicting exemplary data communication flows.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

As indicated above, there are limitations with respect to CDR and oversampling. As described below in additional detail, data may be retrieved from a serial bit stream provided to serial data interface, such as a media independent interface ("MII") other high-speed serial data interface, without clock recovery, namely without CDR and without overclocking. Such data may be retrieved at a Physical Medium Attachment Sublayer-level ("PMA-level") without a gigabit transceiver ("GT"). By avoiding a CDR block and a GT block, data may be retrieved without costs associated with having to use a CDR block or a GT block. Furthermore, data may be retrieved without clock oversampling, and thus avoids having narrowed timing margins associated with having to use oversampling.

Serial or memory interfaces may tend to drift over time. As described below in additional detail, a system that continuously tracks a relative difference between frequencies, such as in parts per million ("ppm"), and/or tracks low frequency wander of a serial bitstream may be used to adjust data delay responsive to either or both of these indexed to clock signals out of phase with respect to one another. Such clocks signals are taken as a fixed reference or index for sampling data. In short, data is shifted to a clock signal, and not the other way around. As each data lane may be independent of one another, issues around skew between clock signals of different lanes may be avoided.

With the above general understanding borne in mind, various configurations of physical layer interfaces for data communication are generally described below.

Figure 1:
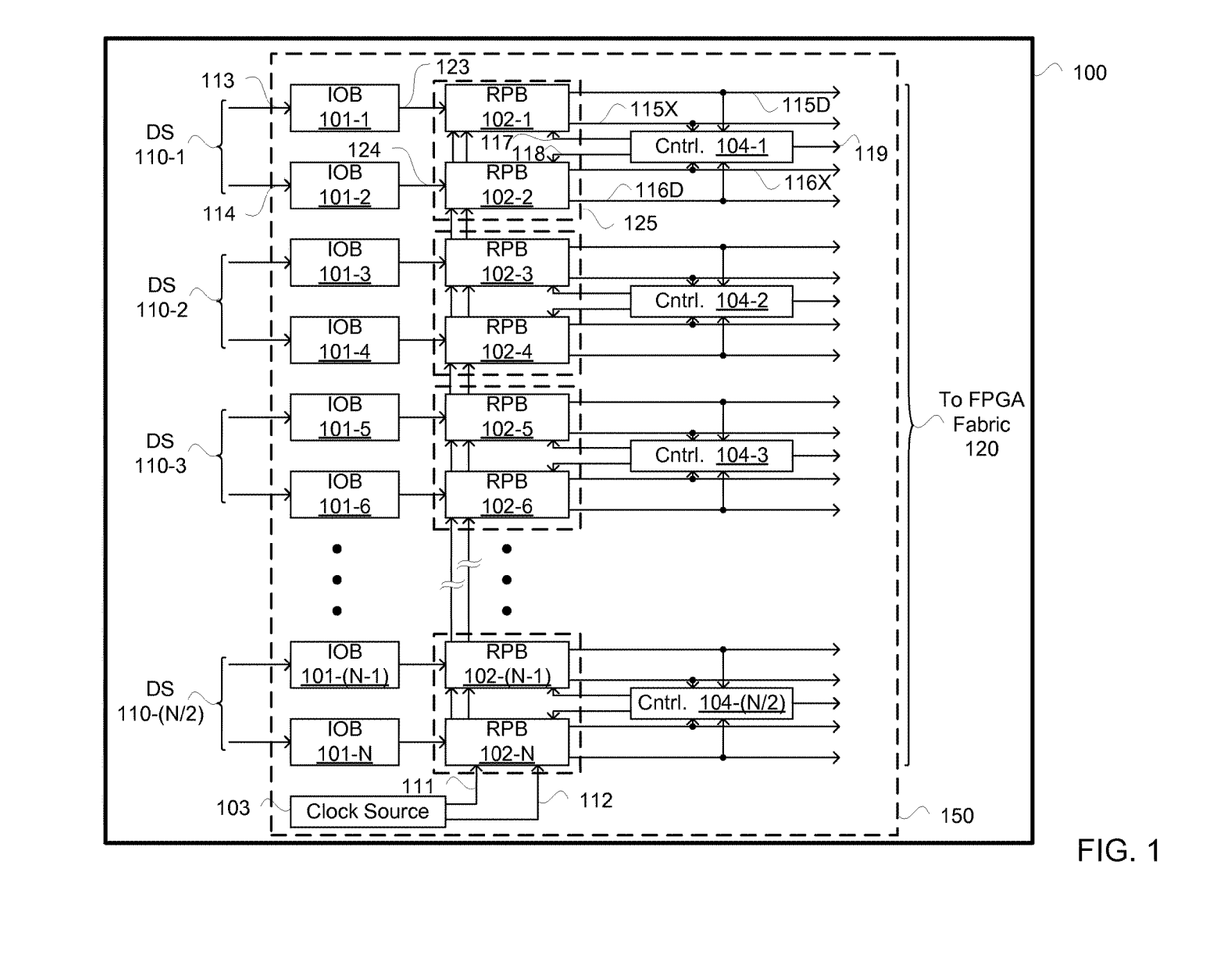
FIG. 1 is a block diagram depicting an exemplary media independent interface ("MII") system of a receiver of an integrated circuit device for communicating data.

FIG. 1 is a block diagram depicting an exemplary media independent interface ("MII") system 150 of a receiver of an integrated circuit device 100 for communicating data. MII system 150 may include an MII, a serial gigabit MII ("SGMII"), a reduced gigabit MII ("RGMII") or other type of gigabit serial interface, which includes a plurality of input blocks of integrated circuit device 100. Serial interfaces, such as SGMII and PCIe for example, may be used to provide serial data without an accompanying clock, in contrast to a source synchronous interface. However, as described herein, a source synchronous receiver interface, which for example may be a Double Data Rate ("DDR") physical layer interface ("PHY") (e.g., DDR3 or DDR4 Synchronous Dynamic Random Access ("SDRAM")), may be used to receive serial data, such as from SGMII or PCIe source, by injecting a local clock into a read clock path. Such read clock path conventionally would be to accept a source synchronous clock that accompanies data of a source synchronous interface and may still be used as such for a source synchronous interface. However, here such read clock path of a source synchronous interface is used to receive a local clock of a receiver for receiving non-source synchronous serial data. For SGMIIs, such interfaces may or may not have an accompanying clock signal, and so for purposes of the description below an SGMII without an accompanying clock signal may be used for tracking drift of data thereof. In this example, a plurality of input/output blocks ("IOBs") 101-1 through 101-N for N a positive integer greater than two may be used to provide such input blocks. However, in another configuration, another type of input buffering may be used. Though much of the following description is in terms of a serial interface, the following description may likewise be used for a memory interface. For example, a source synchronous memory interface, such as for example a type of DDR SDRAM, may use technology as described herein.

In this example, each data link may be for receiving serial differential data, namely differential signals ("DSs") 110-1 through 110-(N/2). There may be as few as two input blocks in use, namely for a single lane of data or data link application. However, conventionally multiple differential lanes of data may be used to communicate a byte of data at a time. While differential or single-ended signals may be used, for purposes of clarity by way of example and not limitation, differential signals are described. Each differential signal 110 includes a positive side input 113 and a negative side input 114.

Groups of two of IOBs 110 may be used to receive such inputs 113 and 114, as described for purposes of clarity with reference only to IOBs 101-1 and 101-2, though more than just two IOBs may be used. 10B 101-1 receives a positive side input 113 and 10B 101-2 receives a negative side input 114 of differential signal 110-1. For example, differential signal 110-1 may be low-voltage differential signaling ("LVDS") or other type of differential signaling for communicating serial data at a high data rate, such as for example at least at approximately 1.25 gigabits-per-second ("gbps") for Gigabit Ethernet or at least at approximately 2.5 gbps for PCIe 1.x.

To retrieve data from differential signals 110-1 through 110-(N/2) respectively provided to groups of two IOBs 101 each, corresponding groupings of two each read or receive path blocks ("RPBs") 102 may be used. In this example, there are RPBs 102-1 through 102-N corresponding and respectively coupled to IOBs 101-1 through 101-N; however, such correspondence is not necessary throughout an integrated circuit device 100. IOBs 101 each provide two outputs. In this example, a positive side data stream 123 corresponding to an associated positive side input 113 is output from each of IOBs 101, and a complemented negative side data stream 124 corresponding to an associated negative side input 114 is output from each of IOBs 101. In another configuration a positive side input may be complemented for output, and a negative side input may be passed through for output without complementing. Data stream 123 may be delayed for matching delay associated with complementing data stream 124. After complementing to provide data stream 124, both data streams 123 and 124 have a same polarity, namely both have positive side orientation. Accordingly pairs of data streams 123 and 124 from a corresponding differential signals 110-1 through 110-(N/2) may be output from each of IOBs 101-1 through 101-N, and each pair of such data streams may be respectively input to RPBs 102-1 through 102-N.

RPBs 102-1 through 102-N are of a physical layer interface ("PHY"). Pairs 125 of RPBs 102 of RPBs 102-1 through 102-N may be coupled to receive differential data inputs, where one rail of such differential data may be complemented, namely either a first data stream 123 or a second data stream 124 of a corresponding differential data input 110 of differential data inputs 110-1 through 110-N/2 may be an inverted version of a corresponding rail of a differential signal 110. A first data stream 123 may be provided to a first RPB 102-1 of a pair of pairs 125 of RPBs 102, and a second data stream 124 may be provided to a second RPB 102-2 of such pair of such pairs 125 of RPBs 102.

A clock signal source 103 may be coupled to provide both a first clock signal 111 and a second clock signal 112 to each RPBs 102. Thus, for example, a first RPB 102-1 and a RPB 102-2 each receive clock signals 111 and 112. First clock signal 111 and second clock signal 112 may be phase related to one another. In this example, clock signals 111 and 112 are 180 degrees out of phase with respect to one another. For this example, clock signal 112 may be an inverted version of clock signal 111, and clock signal 111 may be buffered to match delay associated with inverting clock signal 111 to provide clock signal 112.

Each RPB 102 may output an associated data signal and data crossing ("crossing") signal, as described below in additional detail. Each pair 125 of RPBs 102 may share a control block 104. Along those lines, control blocks 104-1 through 104-(N/2) may correspond to pairs 125 of RPBs 102. Each control block 104 may be coupled to receive a first output signal pair, such as crossing signal 115X and data signal 115D, from a first RPB, such as RPB 102-1, of a pair 125, and a second output signal pair, such as crossing signal 116X and data signal 116D, from a second RPB, such as RPB 102-2, of such pair 125. Each control block 104 may be configured to provide a first delay adjustment signal 117 to a first receive path block, such as RPB 102-1, of a pair 125 to adjust a delay of a data stream 123, and further configured to provide a second delay adjustment signal 118 to a second receive path block 102-2 of such pair 125 to adjust a delay of a data stream 124. Each control block 104 may be configured to output a live/monitor indicator signal 119 to indicate which of RPBs, such as RPBs 102-1 and 102-2 for example, of a pair 125, is currently being used to provide live data and which of such RPBs of such pair 125 is currently being used to provide monitor data but is not currently to be used as a live data feed.

Differential data input, such as from differential signals 110, may be any encoded data that ensures sufficient and timely transitions, namely transitions from logic 1 to logic 0, and vice versa, in order for a receiver to monitor drift relative to a local sampling clock in a timely manner, as described hereinbelow in additional detail. Each control block 104 may be configured to adjust a delay associated with a delay adjustment signal 117 and to adjust a delay of an adjustment signal 118 in same or opposite directions with respect to one another. For example, if delay adjustment signal 117 is incremented to adjust delay, then delay adjustment signal 118 may be decremented to adjust delay, and vice versa, or both delay adjustment signals 117 and 118 may be either incremented or decremented. Control block 104-1 may be configured to switch between RPB 102-1 and RPB 102-2 of a pair 125 for switching between a live path and a monitor path for a delay setting wraparound between delay on RPB 102-1 and delay on RPB 102-2, as described below in additional detail.

A first delay adjustment signal 117 and a second delay adjustment signal 118 are to track drift of a differential data input, such as differential signal 110-1 for example, in a same direction as such drift for a first RPB 102-1 and a second RPB 102-2 of a pair 125. Along those lines, delays may be moved or adjusted in a same direction while tracking drift. When a delay reaches an adjustment endpoint, namely a minimum or maximum, direction of such delay may be changed before resuming tracking drift in a same direction as before. For example, if both first and second adjustable delays are decremented to keep up with drift, when one of such adjustable delays reaches a minimum delay endpoint for adjustment, a switch may be made to the other of such adjustable delays not having reached a minimum endpoint thereof. This allows for continued decrementing of such adjustable delay not having reached a minimum delay compensation or tracking endpoint. Meanwhile, for such adjustable delay having reached a minimum delay adjustment thereof, direction of such adjustable delay may be change from decrementing to incrementing until a stable point anew is found, and once such a stable point is found, then such adjustable delay may be changed from incrementing to decrementing to move in a direction with drift. If such adjustable delays were both incremented to keep up with drift, namely for drift in an opposite direction than that of the above example, then once a maximum delay compensation endpoint was reached by one of such adjustable delays a switch to the other one of such adjustable delays may be made. Accordingly, the example would be the same as above, but decrementing and incrementing would be reversed in the above example. First RPB 102-1 and a second RPB 102-2 of a pair 125 may be delay offset from one another by a portion of a unit interval ("UI"). In this example, by having clock signals 111 and 112 offset from one another by at least approximately a 180 degree phase difference, such portion of a unit interval may be ½ of a UI.

From I/Os, such as IOBs 101, data in a logical time domain, namely a PHY formed of RPBs 102 for sampling, may be provided to other circuitry, such as programmable resources ("fabric") of a Field Programmable Gate Array ("FPGA") 120 as digital data. For further cost savings, in some instances existing hardware for sampling high-speed data from a source synchronous interface, such as for a high-speed source synchronous memory interface, may be reused for shifting data to clocks. As narrow timing margins may be present for high speed source synchronous memory interfaces and/or serial interfaces, considerable circuitry overhead may be avoided by dual use of such circuitry, namely use of a source synchronous interface for a non-source synchronous serial interface.

Furthermore, as described herein, MII system 150 may be sufficiently tolerant to system jitter, which system jitter may reduce an effective size of a data eye, namely reduce a usable portion of a UI, at a receiver. This tolerance may be referred to as receiver jitter tolerance. Jitter may be broken out into in-band jitter and out-of-band jitter. For purposes of clarity by way of example and not limitation, Gigabit Ethernet may have out-of-band jitter for jitter above approximately 620 kHz, which can effectively reduce a UI by approximately 0.74UI. This out-of-band jitter is not tracked, and therefore timing for a PHY as describe herein may be sufficiently accurate to sample approximately a 0.26UI. In-band jitter, namely jitter below approximately 620 kHz for Gigabit Ethernet, may have amplitude greater than 1 UI and thus is tracked. For Gigabit Ethernet, this amplitude may be approximately 8.5UI.

As described below, lower frequency wander may be tracked. Additionally, a bounded ppm difference between received data and a local clock may be tracked. For Gigabit Ethernet, this bounded ppm difference is approximately +/−200 ppm; however, this bounded ppm difference may be different for other types of communication protocols, and accordingly the following description is not limited to Gigabit Ethernet. However, for purposes of clarity by way of example and not limitation, an example of an FPGA PHY is used. However, in other examples, an ASIC, a microprocessor, or any other type of integrated circuit device having a PHY may be used. Along those lines, by re-using circuitry that is already optimized for high speed data acquisition, such as in a same data rate range of Gigabit Ethernet and/or PCIe1.x, data sampling may be performed within a small UI or fraction of a UI with substantially reduced added hardware overhead.

Figure 2:
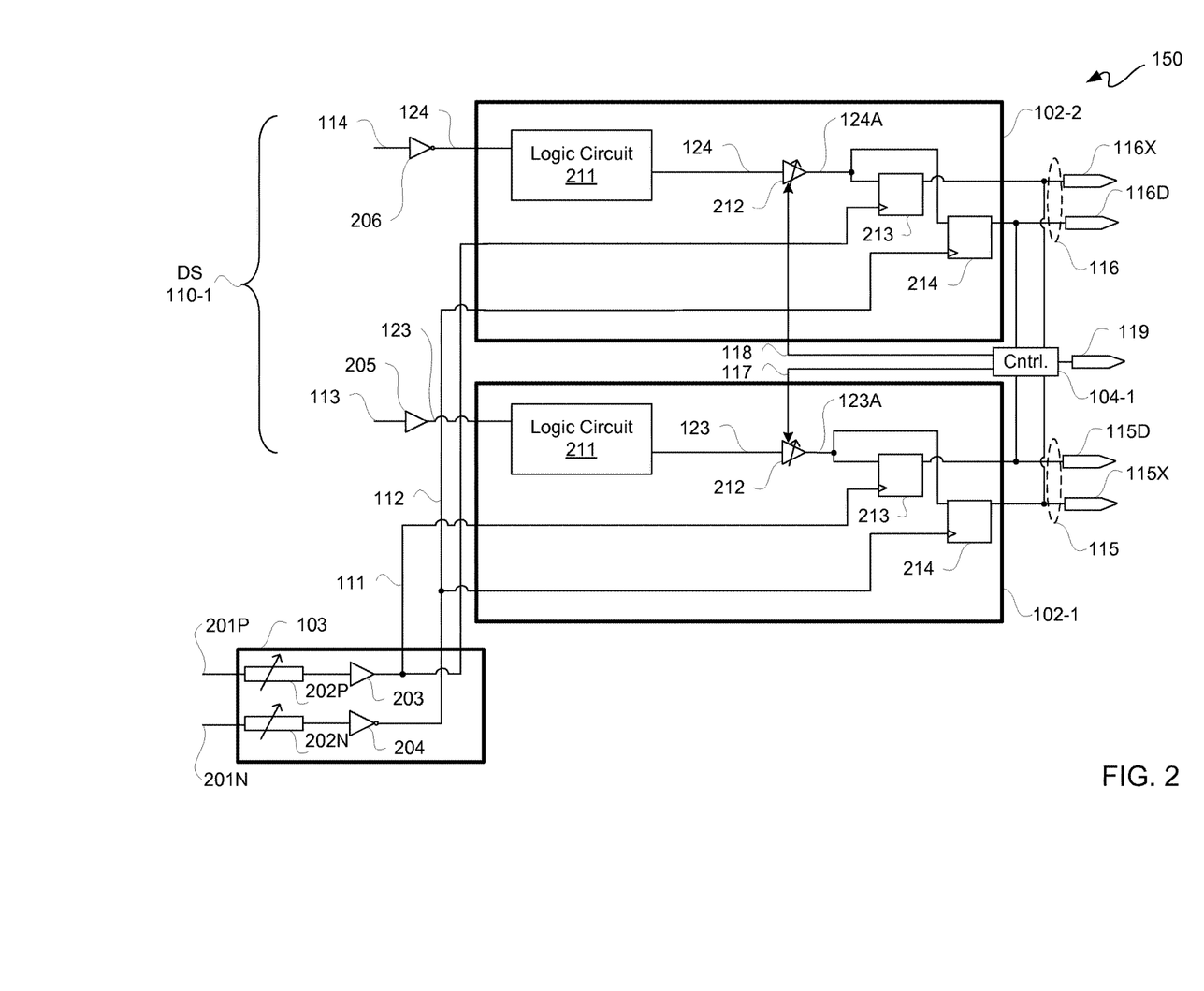
FIG. 2 is a schematic diagram depicting an exemplary MII system of a receiver of an integrated circuit device for communicating data.

FIG. 2 is a schematic diagram depicting an exemplary portion of MII system 150 of a receiver of an integrated circuit device 100 for communicating data. In this exemplary portion, MII system 150 may be for a DDR SDRAM interface. Conventionally, a PHY of a DDR SDRAM interface may include at least a byte of data, along with data strobes, and other known signals. Thus, only a portion of a PHY is illustratively depicted for purposes of clarity and not limitation.

Clock source 103 in this example may include an adjustable delay 202P, a buffer 203, an adjustable delay 202N, and an inverter 204. A positive side data strobe signal 201P and a negative side data strobe signal 201N may respectively be input to an adjustable delay 202P and an adjustable delay 202N. Adjustable delays 202P and 202N may have insertion delays calibrated to be approximately equal to one another, so outputs of adjustable delays 202P and 202N may be at least approximately 180 degrees out of phase with one another. Output of adjustable delay 202N may be input to inverter 204 to provide clock signal 112, and output of adjustable delay 202P may be input to buffer 203 to match delay of inverter 204 to provide clock signal 111. In another implementation, a reference clock signal may be provided as an input clock signal to inverter 204 and buffer 203 of clock source 103 to more directly generate clock signals 111 and 112.

Negative or complement side input 114 may be input to inverter 206 to provide an inverted or "positive polarity" version as an output thereof as data stream 124. Positive side input 113 may be input to buffer 205 to match delay of inverter 206 to provide an output thereof as data stream 113. Thus, inverter 206 may remove a complement as between inputs 113 and 114 of differential signal 110-1.

For a memory interface, data streams 123 and 124 may be input to respective logic circuit blocks 211 of RPBs 102-1 and 102-2. For example, logic circuit blocks 211 may be for a DDR implementation. Ultimately, read or received data on data streams 123 and 124 may respectively be input to programmably adjustable delays 212 of RPBs 102-1 and 102-2. Programmable adjustable delays 212 may be data eye delays, such as Input Delay Resources ("IDELAYS") of an FPGA.

Output of adjustable delay 212 of RPB 102-1 may be a delayed version of data stream 123, namely a data drift delay adjusted data stream 123A. Delay of programmably adjustable delay 212 of RPB 102-1 may be responsive to delay adjustment signal 117 provided to such programmably adjustable delay 212 from control block 104-1. Output of adjustable delay 212 of RPB 102-2 may be a delayed version of data stream 124, namely a data drift delay adjusted data stream 124A. Delay of programmably adjustable delay 212 of RPB 102-2 may be responsive to delay adjustment signal 118 provided to such programmably adjustable delay 212 from control block 104-1. Thus, it should be understood that delay of programmably adjustable delays 212 of RPBs 102-1 and 102-2 may be independently adjusted.

Clock signal 111 is provided to a clock port of each register 213 of RPBs 102-1 and 102-2, and clock signal 112 is provided to a clock port of each register 214 of RPBs 102-1 and 102-2. Again, for this example, clock signals 111 and 112 are, if not, 180 degrees out of phase with respect to one another, at least close to being 180 degrees out of phase with respect to one another. Data stream 123A is provided to a data input port of each register 213 and 214 of RPB 102-1, and data stream 124A is provided to a data input port of each register 213 and 214 of RPB 102-2.

Output of register 213 of RPB 102-1 is a "positive-side" data signal 115D, and output of register 214 of RPB 102-1 is a "negative-side" crossing signal 115X. Output of register 213 of RPB 102-2 is a "positive-side" crossing signal 116D, and output of register 214 of RPB 102-2 is a "negative-side" data signal 116D. Accordingly, it should be understood that though "positive-side" and "negative-side" with respect to outputs of RPBs 102-1 and 102-2 are in same positions, data and crossing signals are in opposite positions with respect to outputs of RPBs 102-1 and 102-2. This difference in these outputs results from having clock signals 111 and 112 out of phase with respect to one another by 180 degrees or 0.5UI, or at least close to such value, and adjusting delays of adjustable delays 212 in same and opposite directions, as described below in additional detail.

Each RPB 102 may be tightly designed such that data from a data stream arrives to both registers or flops 213 and 214 at the same time. Registers 213 may be "positive-side" flops each receiving a "positive-side" clock signal 111, and registers 214 may be "negative-side" flops each receiving a "negative-side" clock signal 112. Both clock signals 111 and 112 may be trained, such as during an initial calibration sequence, to be at least approximately 180 degrees phase shifted with respect to one another. Clock signals 111 and 112 may be frequency locked to a local oscillator, while data of data streams 123 and 124 may be frequency locked to a remote source of such data, such as a memory or a transmitter for example. Clock signals 111 and 112 with variable delay sources may be de-skewed with respect to one another to effectively maintain clock signals 111 and 112 fixed.

If data signal drift exceeds a maximum location for delay compensation by an adjustable delay 212 currently being used for live data, an adjustable delay 212 currently being used to monitor data may be switched to provide live data, as a wraparound of delay compensation. Because adjustable delays 212 are incremented or decremented in a same direction to track drift until one of such adjustable delays reaches an adjustment endpoint, namely either a maximum or a minimum, then such adjustable delay 212 reaching an endpoint of tracking capability changes direction and moves with drift rather than against drift. Such adjustable delay 212 may move with drift for ½UI, at which point such adjustable delay may lock and then move against drift again. It is assumed that an endpoint is reached before a switch from one adjustable delay to another; however, in another configuration a location proximate to an endpoint may be used. Accordingly, more generally a switch may be made when a delay adjustment is at least proximate to an endpoint, including without limitation at an endpoint. Because adjustable delays 212 both move in a same direction while tracking drift until one of such delays reaches an endpoint, either a maximum or a minimum, one of such adjustable delays 212 may always have ½UI more delay than the other. Thus, after a wraparound from one adjustable delay 212 to another, such other adjustable delay 212 has headroom for delay compensation for tracking data drift. Data drift may be persistent over time, and so switching from live to monitor status of RPBs 102-1 and 102-B may go from one to another back and forth for multiple delay adjustment wraparounds, as described below in additional detail. However, by having such wraparound conditioned upon reaching end of a delay compensation level, such wraparound may be less subject to semiconductor process, voltage, and/or temperature ("PVT") variations. In other words, even if PVT variation causes the number of phase interpolator or other increments or gradations to change what constitutes 0.5UI, operation of delay compensation does not rely upon a fixed number of increments for 0.5UI as such wraparound location may vary with PVT variation.

Control block 104-1 may be coupled to receive an output signal pair 115, namely including output data signal 115D and output crossing signal 115X, from RPB 102-1, and an output signal pair 116, namely including output data signal 116D and output crossing signal 116X, from RPB 102-2. Control block 104-1 may be configured to provide a delay adjustment signal 117 to an adjustable delay 212 of RPB 102-1 to adjust a delay of data stream 123 to provide data drift delay adjusted data stream 123A. Control block 104-1 may further be configured to provide a delay adjustment signal 118 to an adjustable delay 212 of RPB 102-2 to adjust a delay of data stream 124 to provide data drift delay adjusted data stream 124A. Control block 104-1 may be configured to provide a signal pair or RPB indicator signal 119 to indicate which of signal output pair 115 and signal output pair 116 is live and which is monitor.

Adjustment signals 117 and 118 may be used to adjust delay of corresponding programmably adjustable delays 212 to phase track incoming data on data streams 123 and 124, respectively, with fixed clock signals 111 and 112. In short, data is moved to a clock, and not the other way around, and a fixed clock signal is used to sample data rather than a CDR clock. Registers 213 and 214 may respectively obtain a data sample and a crossing sample responsive to clock signals 111 and 112, respectively.

Figure 31:
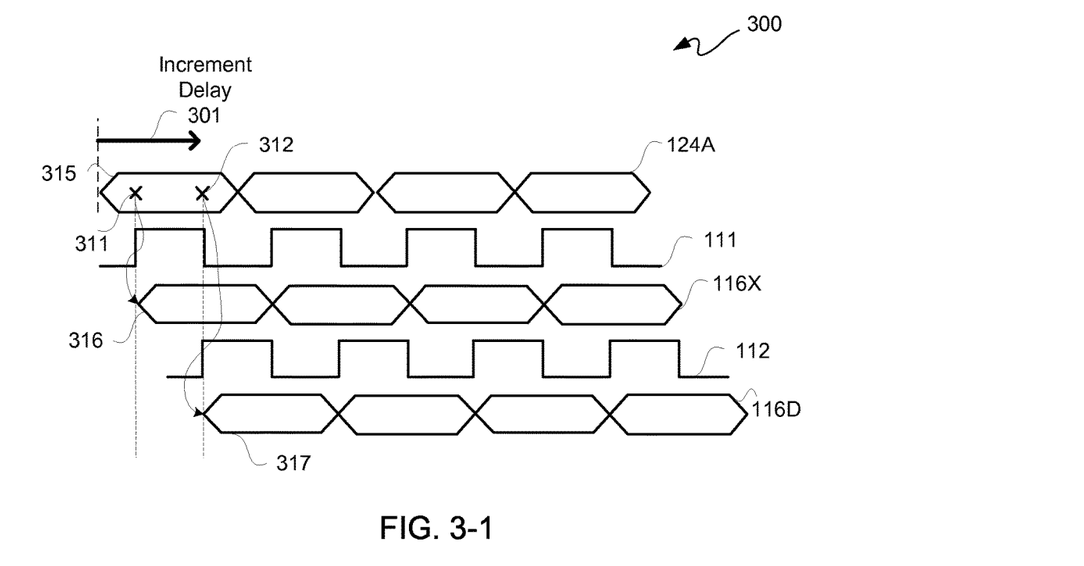
Figure 32:
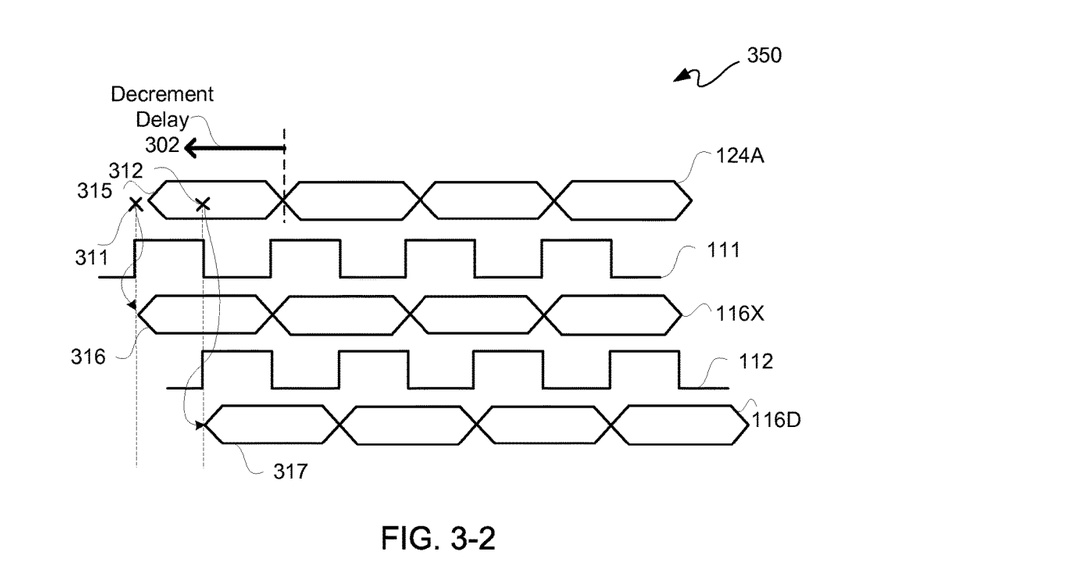

In accordance with the above description, FIGS. 3-1 and 3-2 are respective signal diagrams depicting exemplary signal timings 300 and 350, respectively. Samples are obtained at 311 and 312 of a data stream 124A. Signal timings 300 and 350 are for RPB 102-2 for purposes of clarity by way of example and not limitation. Accordingly, the following description is applicable to each of RPBs 102.

For signal timing 300, a crossing sample 311 is sampled with a rising edge of clock signal 111 for data value 315 of data stream 124A, and a data sample 312 is sampled with a rising edge of clock signal 112 for data value 315 of data stream 124A. Thus, both crossing sample 311 and data sample 312 retrieve a same data value for associated clock cycles of clock signals 111 and 112. Accordingly, data value 316 of crossing signal 116X may equal a data value 317 of data signal 116D. For this condition of data values for associated crossing and data samples equal to one another, controller 104-1 may be configured to increment delay of delay adjustment signal 118 of a programmable adjustable delay 212 of RPB 102-2. Accordingly, such increment of delay 301 causes data stream 124A to be phase shifted to add more delay, namely a lagging time direction, which effectively for fixed clock signals 111 and 112 that are 0.5UI out of phase with one another phase shifts data stream 124A toward making crossing sample 311 and data sample 312 unequal.

For signal timing 350, a crossing sample 311 is sampled with a rising edge of clock signal 111 for data value prior to data value 315 of data stream 124A, and a data sample 312 is sampled with a rising edge of clock signal 112 for data value 315 of data stream 124A. Thus, crossing sample 311 and data sample 312 retrieve different data values for associated clock cycles of clock signals 111 and 112, so data value 316 of crossing signal 116X does not equal data value 317 of data signal 116D. For this condition of data values for associated crossing and data samples unequal to one another, controller 104-1 may be configured to decrement delay of delay adjustment signal 118 of a programmable adjustable delay 212 of RPB 102-2. Accordingly, such decrement of delay 302 causes data stream 124A to be phase shifted to reduce delay, namely a leading time direction, which effectively for fixed clock signals 111 and 112 that are 0.5UI out of phase with one another phase shifts data stream 124A toward making crossing sample 311 and data sample 312 equal.

Figure 41:
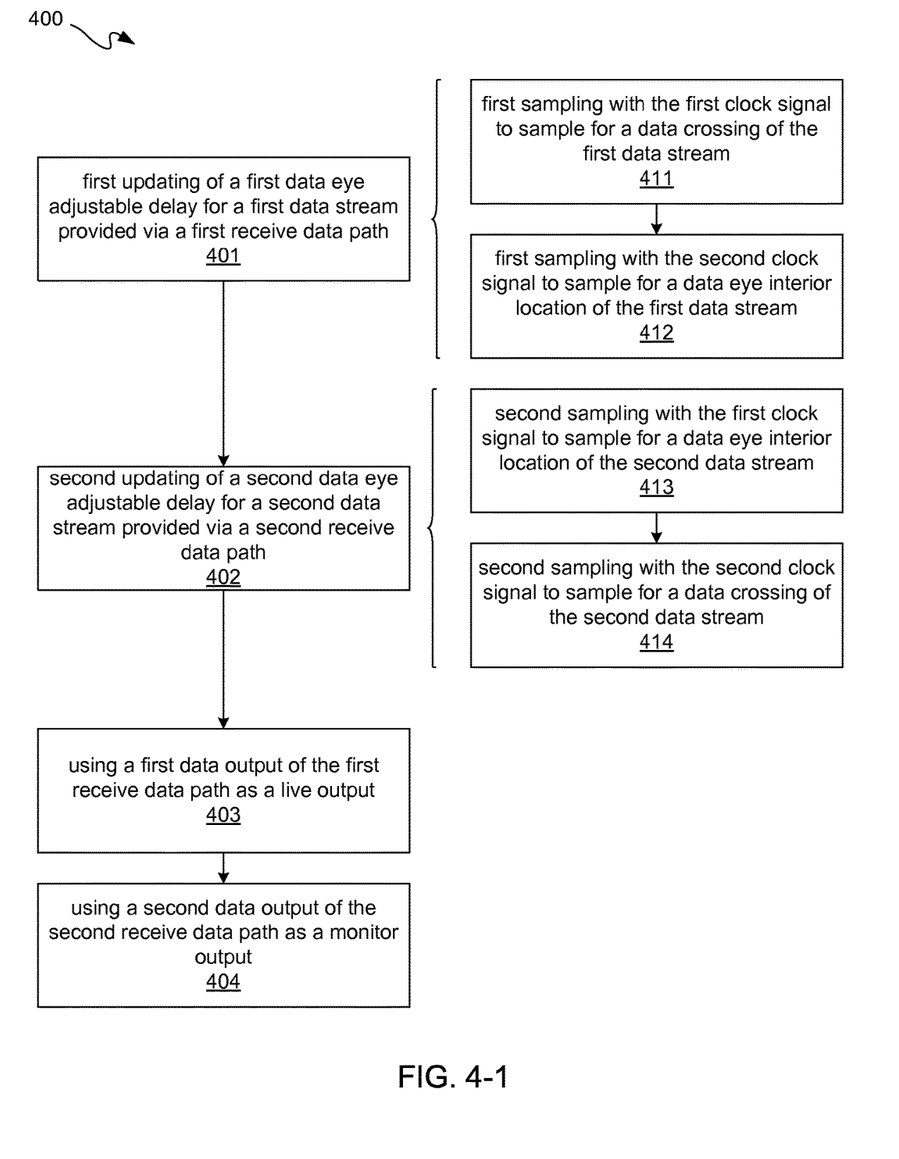

FIG. 4-1 is a flow diagram depicting an exemplary data communication flow 400 for MII system 150 of FIG. 2. Data communication flow 400 is further described with simultaneous reference to FIGS. 2 and 4-1.

At 401, a data eye adjustable delay 212 may be updated for a data stream 123 provided to of RPB 102-1. At 402, a data eye adjustable delay 212 may be updated for a data stream 124 provided to of RPB 102-2. Updating at 401 and 402 may be done at the same time. Updating at 401 and 402 respectively may adjust a delay of data stream 123 and a delay of data stream 124 with respect to clock signals 111 and 112. Again, clock signals 111 and 112 are offset phase related to one another.

Data eye adjustable delays 212 can be adjusted to ensure that a clock signal 111 or 112 is centered in a UI for data samples. For updating, when a data sample equals a crossing sample, delay of a data eye adjustable delay 212 may be incremented. However, for updating, when a data sample does not equal a crossing sample, delay of a data eye adjustable delay 212 may be decremented.

Updating at 401 may include operations at 411 and 412, and updating at 402 may include operations at 413 and 414. At 411, a clock signal, such as either clock signal 111 or 112, may be used to sample for a data crossing of a data stream, such as either data stream 123A or 124A. At 412, a clock signal, such as either clock signal 111 or 112, may be used to sample for a data eye interior location, namely sample for a data value, of a data stream, such as either data stream 123A or 124A.

At 413, a clock signal, such as either clock signal 111 or 112, may be used to sample for a data eye interior location, namely sample for a data value, of a data stream, such as either data stream 123A or 124A. At 414, a clock signal, such as either clock signal 111 or 112, may be used to sample for a data crossing of a data stream, such as either data stream 123A or 124A.

If data stream 123A is sampled at operations 411 and 412, then data stream 124A is sampled at operations 413 and 414, and vice versa. If clock signal 111 is used to obtain data samples of data stream 123A at 411 and clock signal 112 is used to obtain crossing samples of data stream 123A at 412, then clock signal 112 is used to obtain data samples of data stream 124A at 413 and clock signal 111 is used to obtain crossing samples of data stream 124A at 414.

At 403, a data output, such as either data signal 115D or 116D, of either of RPB 102-1 or 102-2, respectively, may be used as a live output. At the same time as such live output is used at 403, at 404 a data output, such as the other one of either data signal 115D or 116D not used at 403, of either of RPB 102-1 or 102-2, respectively, may be used as a monitor output.

By monitoring data traffic by a control block, such as for example control block 104-1 and updating delays of adjustable delays 212 in both RPBs 102 of a pair, UI sample may lock to sampling data ("D sampling") generally at the center of a UI, unless some offset is preset, and sample at the edge of such UI, namely at the edge of a data eye, to sample crossings ("X sampling"). By using sampled crossings ("X") and sampled data ("D") from only one RPB 102 of a pair at a time as a live stream, an {X, D} pair from positive and negative sampling registers in one RPB 102 of a pair, and conversely a {D, X} pair from positive and negative sampling registers in another RPB 102 of such a pair, may be used to have RPBs 102 of such pair have data eye delays 212 offset from one another by 0.5UI, or at least approximately thereto.

Accordingly, sampling with clock signal 112 to sample data for a data eye interior location of data stream 123A may be to adjust delay of data eye adjustable delay 212 of RPB 102-1 to move a sampling position thereof to a central location of a data eye of data stream 123A in response to data drift of data stream 123A. Likewise, sampling with clock signal 111 to sample data for a data eye interior location of data stream 124A may be to adjust delay of data eye adjustable delay 212 of RPB 102-2 to move a sampling position thereof to a central location of a data eye of data stream 124A in response to data drift of data stream 124A.

Figure 42:
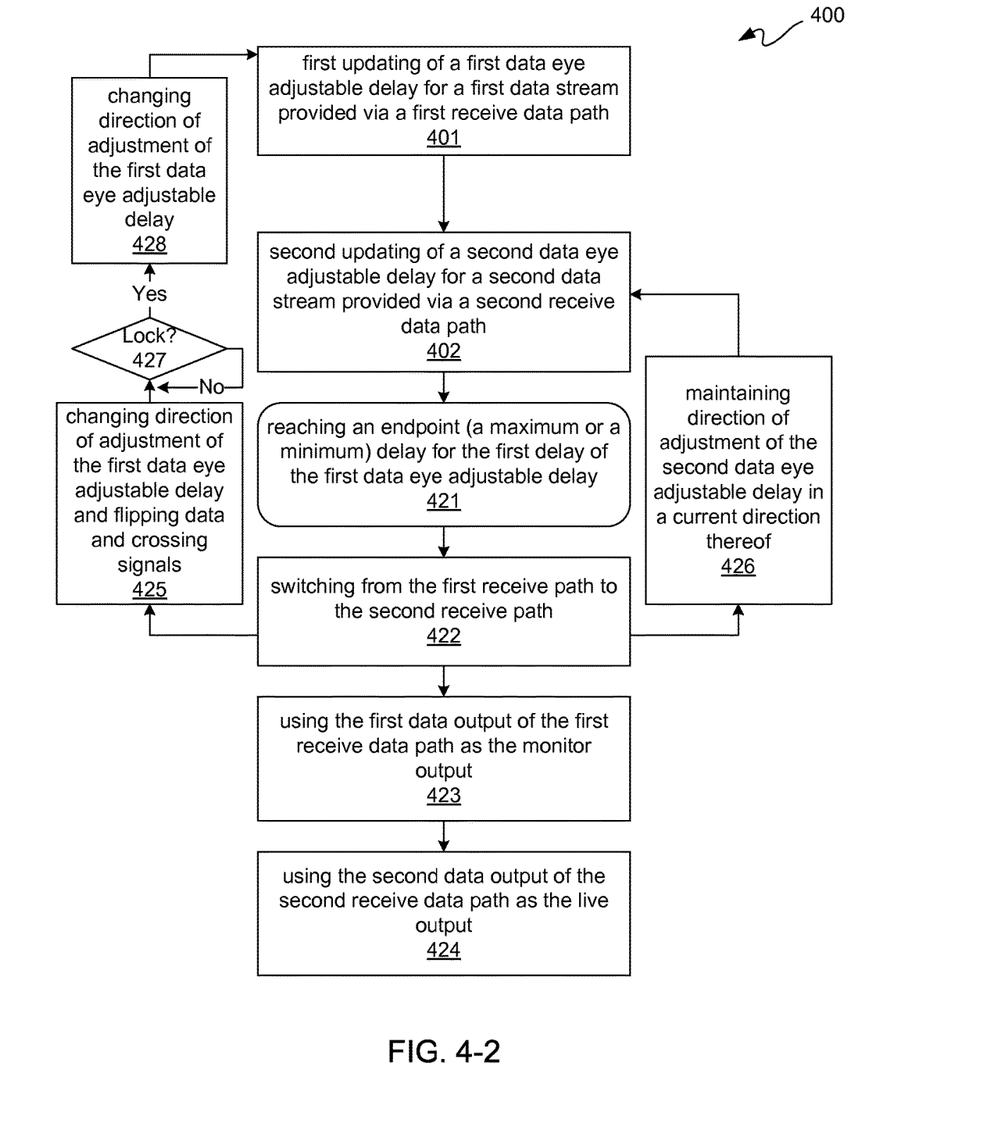

FIG. 4-2 is the flow diagram of FIG. 4-1 depicting an exemplary data communication flow 400 for MII system 150 of FIG. 2 for reaching a wraparound condition. Data communication flow 400 for a wraparound condition is further described with simultaneous reference to FIGS. 2, 4-1 and 4-2.

Assuming for purposes of clarity by way of example and not limitation, prior to a wraparound condition, output of RPB 102-1 is used to provide a live data feed and output of RPB 102-2 is used to provide a monitor data feed. Thus, at 401, an adjustable delay 212 of RPB 102-1 may be updated at 401, and at 402, an adjustable delay 212 of RPB 102-2 may be updated. However, for a persistent data drift, updating at 401 may ultimately reach an adjustment endpoint setting, which for purposes of clarity by way of example and not limitation shall be assumed to be a maximum delay, of a data eye adjustable delay 212 at 421. In response to reaching such a maximum delay at 421, at 422 a switch may be made from RPB 102-1 to RPB 102-2 for live and monitor outputs. Continuing the above example, after such switch at 422, output of RPB 102-1 may provide a monitor data feed, and output of RPB 102-2 may provide a live data feed. Because RPBs 102 of a pair are operated opposite one another immediately after a switch, when RPB 102-1 is being incremented at 401 for delay adjustment updating, RPB 102-2 is being incremented at 402 for delay adjustment updating centered to a UI. However, after a switch in the above example, RPB 102-2 continues to be incremented for a live feed, and RPB 102-1 is now decremented until a stable point anew is reached. Effectively, this means that delay is adjusted to go against drift for RPB 102-1 while delay continues to go with drift for RPB 102-2. This adjustment against direction of drift for RPB 102-1 may continue for at least approximately a predetermined offset, which in this example is 0.5UI. Accordingly, delay compensation of RPBs 102 of such pair approach one another up to such predetermined fraction of a UI offset, such as for example approximately a 0.5UI offset. In other words, as a live data stream is incremented, or decremented, in delay until a maximum, or minimum, is reached, such maximum, or minimum, location is generally at the center of the UI for one of such RPBs and would be at the center of the UI for the other of such RPBs other than an offset of 0.5UI.

For a switch, a delay wraparound condition exists where, in this example, adjustable delay 212 of RPB 102-1 may be at a maximum value setting and adjustable delay 212 of RPB 102-2 may not be at a maximum value setting for a direction of increment thereof. So for a switch, sampling positions may be at about the same location for both RPBs 102 of a pair, but an adjustable delay 212 of an RPB 102 providing a live feed data stream may be at an adjustment endpoint, namely extreme increment position, depending on direction of data drift, whereas the other RPB 102 of a pair is generally away from a maximum delay adjustment setting, namely has headroom to adjust for data drift due to the offset. By having at least some range for continued increment, a switch may be made to the other RPB to continuously track data drift, namely to track in-band jitter. For drift in the opposite direction of that in the above example, both RPBs 102 may be decremented to track drift until a live feed RPB of such pair reaches a minimum adjustment position, namely an extreme decrement position, and then a switch may be made.

Accordingly, in response to such switching from RPB 102-1 to RPB 102-2 as a live output, at 423 a data output 115D of RPB 102-1 may be used as a monitor output. At the same time, in response to such switching from RPB 102-1 to RPB 102-2, at 424 a data output 165D of RPB 102-2 may be used as a live output. Moreover, once RPB 102-2 reaches an endpoint delay adjustment value, a switch back to RPB 102-1 may be made.

Accordingly, to compensate for data drift of an RPB 102 of a pair used as a live output, either incrementing or decrementing of a delay of a data eye adjustable delay 212 of an RPB 102 of a pair may be used responsive to direction of data drift of a data stream being sampled for such live output.

For a live output, updating is either incrementing or decrementing delay of a data eye adjustable delay 212 of an RPB 102 of a pair in a same direction of drift of a data stream sampled by such an RPB 102. For a monitor output, updating is either decrementing or incrementing delay of a data eye adjustable delay 212 of the other RPB 102 of such pair to an opposite direction of that previously used, namely against the direction with respect to direction of data drift of a data stream sampled by such RPB 102, until a lock is found and then such monitor stream resumes updating, either incrementing or decrementing delay of a data eye adjustable delay 212 of an RPB 102 of a pair, in a same direction of drift of a data stream sampled by such an RPB 102.

From a switching operation at 422, at 425, a data signal and a crossing signal are flipped for an RPB 102 just switched to a monitoring status. Additionally, at 425, a direction of adjustment of delay of a data eye adjustable delay 212 of an RPB 102 of a pair may be changed from a previous direction to a current direction, where such current direction is opposite such previous direction, for subsequent updating at 401 of a monitor data stream. If a previous direction is decrementing delay of a data eye adjustable 212, changing is to incrementing of such delay of such data eye adjustable delay 212 for the then current direction. If, however, a previous direction is incrementing delay of a data eye adjustable 212, changing is to decrementing of such delay of such data eye adjustable delay 212 for the then current direction. At 425, direction is changed to be in against the direction of data drift. However, at 427, it is determined whether a lock to data, such as sampling data at a center of a data eye, is obtained. If no lock is obtained as determined at 427, then adjusting against the direction of data drift toward a predetermined offset continues at 425. If, however, at 427 a lock is determined to be obtained, then at 428 direction is changed to be with direction of data drift for delay adjustment of a data eye adjustable delay for an RPB in a monitoring status, and updating continues at 401 with such direction being with the direction of data drift.

After a switch 421, at 426, a direction of adjustment of delay of a data eye adjustable delay 212 of the other RPB 102 of such pair may be maintained in its current direction for subsequent updating at 402 of a live data stream. In other words, an RPB 102 of a pair switched to for providing a live data stream continues to be updated in the same direction, namely with the direction of data drift.

A sequence of switching back and forth form one RPB to another RPB of a pair, with corresponding changes of direction for subsequent updating of a monitor data stream, may be performed to track data drift over time. Operations may be performed in parallel to have live and monitor outputs generated in parallel. Thus, data drift in a lagging or leading direction may be tracked across multiple UI periods for long term tracking.

Control blocks 104 may be configured to track low frequency wander of a serial bitstream to adjust data delay responsive to sampling by relatively fixed clock signals out of phase with respect to one another. Additionally, there may be a bounded ppm difference between received data and a local clock, and control circuitry may be configured to track this difference to maintain such bounding in order to provide a relatively fixed clock signal with respect to data for such delay compensation.

Generally, voltage variation, such as for example changes in threshold voltage of transistors of an adjustable delay 212, may be avoided for such phase tracking. In other words, threshold voltage updating to adjustable delays 212 may be avoided for purposes of phase tracking by MII 150.

Figure 5:
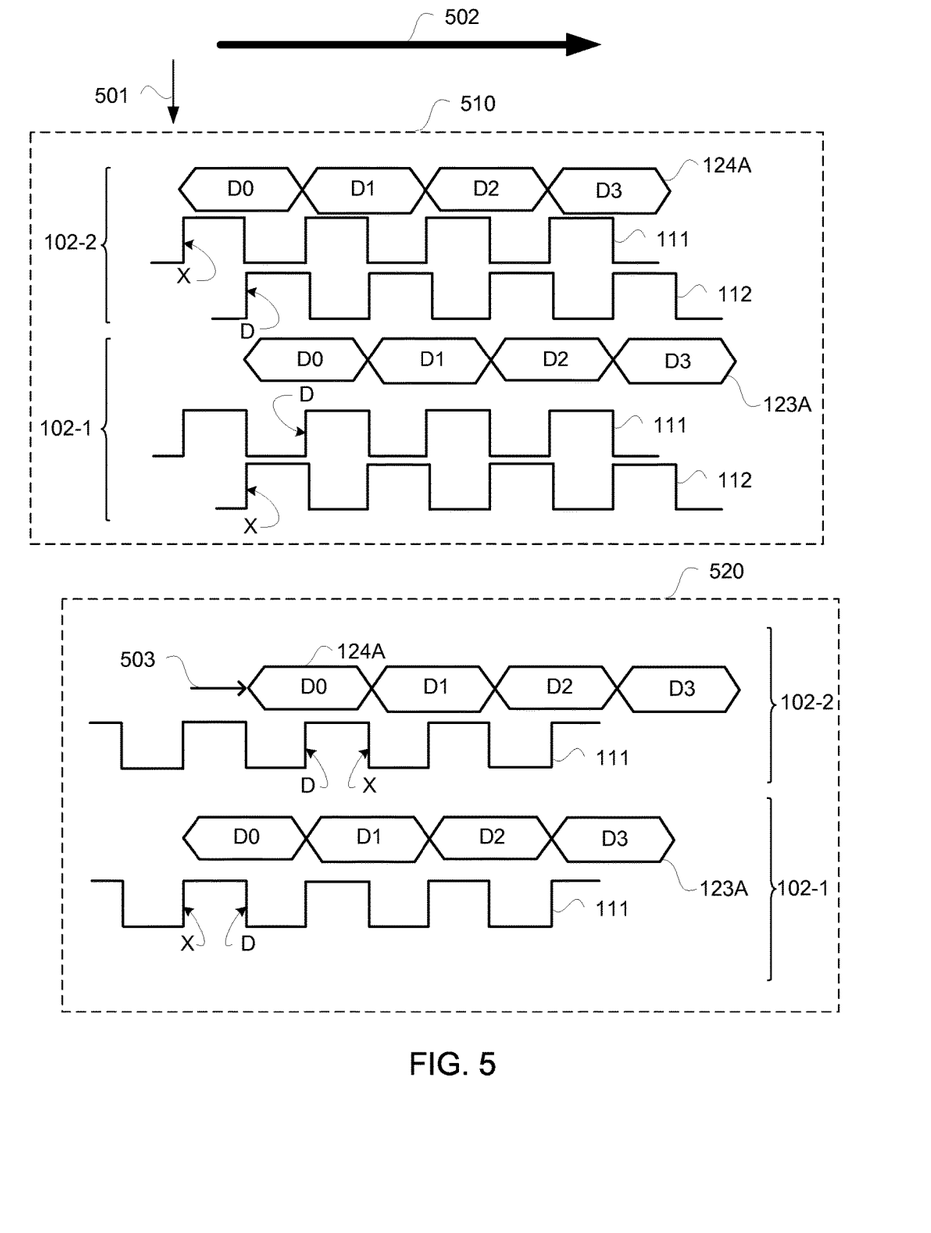
FIG. 5 is a signal diagram depicting exemplary signal timings.

FIG. 5 is a signal diagram depicting exemplary signal timings 510 and 520, which may correspond to data communication flow 400 of FIGS. 4-1 and 4-2 for MII system 150 of FIG. 2.

For signal timing 510, acquired live data is obtained from RPB 102-2, as data samples D are aligned to centers of data eyes in data stream 124A and as crossing samples X are aligned to data crossings in data stream 124A as sampled by rising edges of clock signals 112 and 111, respectively. Arrow 501 indicates a location of minimum delay for adjustable delay 212 of RPB 102-2, and arrow 502 indicates a direction of data drift. Likewise, though offset by 0.5UI, acquired monitor data is obtained from RPB 102-1, as data samples D are aligned to centers of data eyes in data stream 123A and as crossing samples X are aligned to data crossings in data stream 123A as sampled by rising edges of clock signals 111 and 112, respectively.

When a data eye adjustable delay 212 of a live RPB 102 of a pair, such as RPB 102-2 in this example, underruns or overruns, a switch is made to another RPB of such pair, such as RPB 102-1 in this example as indicated in signal timing 520. In sample timing 520, a single clock signal 111 is illustratively depicted where data samples D are obtained on rising edges and crossing samples are obtained on falling edges of such clock signal 111. Along those lines, it should be appreciated that registers may be rising or falling edge triggered, and thus even though two clock signals 111 and 112 are illustratively depicted, a single clock signal, such as clock signal 111 for example, may be used to clock both registers 213 and 214, where such registers are triggered opposite of one another.

In signal timing 520, a switch is made to have acquired live data sourced from RPB 102-1, where data samples D are aligned to centers of data eyes in data stream 123A and crossing samples X are aligned to data crossings in data stream 123A as sampled by rising edges and falling edges, respectively, of clock signal 111. Arrow 503 is used to indicate a direction of delay compensation of data stream 124A.

Even though data samples D are aligned to centers of data eyes in data stream 124A and crossing samples X are aligned to data crossings in data stream 124A as sampled by rising edges and falling edges, respectively, of clock signal 111, an adjustable delay 212 of RPB 102-2 is out of room for any more incremental adjustment for drift 502. Hence, a switch is made to RPB 102-1, which is sampling at data centers and crossings of data stream 123A. Furthermore, when a data eye adjustable delay 212 of RPB 102-1 subsequently underruns or overruns, as switch back to RPB 102-2 may be performed as such switched to RPB may have been repositioned for sampling with ability for additional delay compensation, as described herein.

Samples D and X may respectively be sampled from negative clock signal 111 and positive clock signal 112 in RPB 102-2, while corresponding samples D and X may respectively be sampled from positive clock signal 112 and negative clock signal 111 in RPB 102-1. This difference may be used to ensure that when a data eye adjustable delay in one RPB 102 of a pair underruns or overruns, a data eye adjustable delay in another RPB 102 of such pair is continually at least approximately 0.5UI in delay away from such an underrun or overrun. Therefore, a switch between RPBs 102 of a pair can occur without losing data.

For example, for drift 502, when RPB 102-2 reaches minimum delay tap of an adjustable delay 212, a swap to RPB 102-1 may be made, where RPB 102-1 is guaranteed to have delay margin for compensation. RPB 102-1 may be continue to be updated in a same direction with the flow of data drift 502, which in the example for drift 502 is decremented. In general, an RPB acquiring serial data for a live output always has its data eye adjustable delay adjusted or moved with the direction of data drift.

After switching RPBs 102 of a pair, an RPB 102 of such pair with a current underrun or overrun condition, has data signal and crossing signal swapped. In this example RPB 102-2 would now use crossing signal 116X as a data signal and would now use data signal 116D as a crossing signal. Additionally, updating of such monitor data stream RPB 102 of a pair changes direction to move with drift. In general, an RPB acquiring serial data for a monitor output always has its data eye adjustable delay adjusted or moved against the direction of data drift for some period of time after a switch. Thus, if data samples and crossing samples have a same data value, a data eye adjustable delay 212 of a monitoring RPB, which in this example is RPB 102-2, is decremented, and not incremented as previously described. Likewise, if data samples and crossing samples have different data values, a data eye adjustable delay 212 of a monitoring RPB, which in this example is RPB 102-2, is incremented, and not decremented as previously described. As data drift 502 continues, a monitoring RPB, which in this example is RPB 102-2, finds a data sample UI centering position. Adjustment of a data eye adjustable delay 212 of a monitoring RPB, which in this example is RPB 102-2, stops being adjusted to move in the same direction as data drift generally after a change of 0.5UI of delay. A change of 0.5UI of delay is generally where a lock to data samples of a data bitstream, namely data bitstream 124A in this example, is obtained.

Once a lock is obtained, adjustment of a data eye adjustable delay 212 of a monitoring RPB 102 of a pair, which in this example is RPB 102-2, may be adjusted to move with the direction of data drift 502. Because a monitoring RPB is data locked to a central position of a data eye, when a live data stream source RPB 102 of a pair reaches a minimum delay location, such as for example zero delay, a switch or handoff to such a monitoring RPB 102 may be performed to have such monitoring RPB 102 be a live data stream source RPB of such pair. Additionally, a monitoring RPB 102 of a pair reaches a lock state, namely finds X and D samples before a live data stream source RPB 102 of such a pair reach an adjustment endpoint, namely a minimum delay location in this example, because a live data stream source RPB 102 may be updated at the rate of data drift while a monitoring RPB 102 may be updated at an update loop bandwidth of data communication flow 400. Accordingly, update loop bandwidth is faster than data drift, so a lock condition occurs before an adjustment endpoint, namely a minimum delay location in this example, is reached.

Depending on direction of data drift, there are effectively two endpoint settings of an adjustable delay. For data drift 502, a zero delay may be an endpoint setting, namely a minimum delay. However, data drift may be in a direction opposite the direction of data drift 502.

Figure 6:
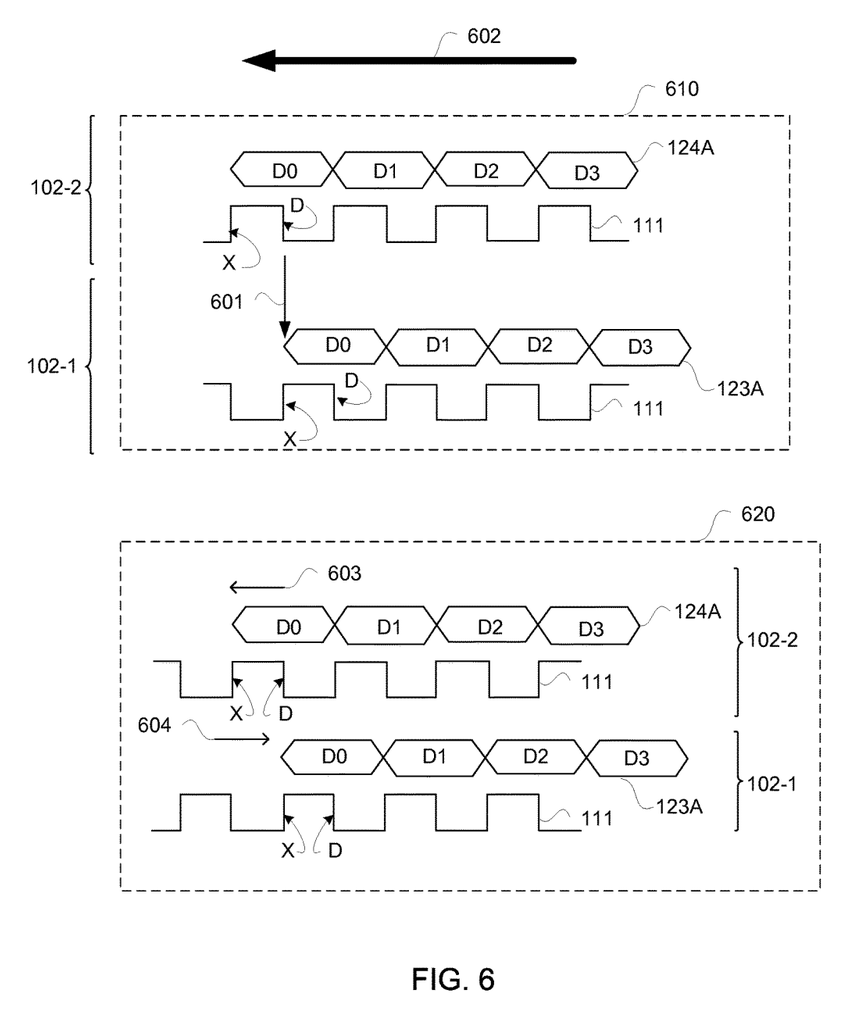
FIG. 6 is a signal diagram depicting exemplary signal timings.

FIG. 6 is a signal diagram depicting exemplary signal timings 610 and 620, which may correspond to data communication flow 400 of FIGS. 4-1 and 4-2 for MII system 150 of FIG. 2.

For signal timing 610, acquired live data is obtained from RPB 102-1, as data samples D are aligned to centers of data eyes in data stream 123A and as crossing samples X are aligned to data crossings in data stream 123A as sampled by falling and rising edges, respectively of clock signal 111. Arrow 601 indicates a location of an adjustment endpoint, namely a maximum delay, for adjustable delay 212 of RPB 102-1, and arrow 602 indicates a direction of data drift. Likewise, though offset by 0.5UI, acquired monitor data is obtained from RPB 102-2, as data samples D are aligned to centers of data eyes in data stream 124A and as crossing samples X are aligned to data crossings in data stream 124A as sampled by falling and rising edges, respectively, of clock signal 111.

When a data eye adjustable delay 212 of a live RPB 102 of a pair, such as RPB 102-1 in this example, underruns or overruns, a switch is made to another RPB of such pair, such as RPB 102-2 in this example as indicated in signal timing 620.

In signal timing 620, a switch is made to have acquired live data sourced from RPB 102-2, where data samples D are aligned to centers of data eyes in data stream 124A and crossing samples X are aligned to data crossings in data stream 124A as sampled by falling edges and rising edges, respectively, of clock signal 111. Arrow 603 is used to indicate a direction of delay compensation of data stream 124A, and arrow 604 is used to indicate a direction of delay compensation of data stream 123A.

Even though data samples D are aligned to centers of data eyes in data stream 123A and crossing samples X are aligned to data crossings in data stream 123A as sampled by falling edges and rising edges, respectively, of clock signal 111, an adjustable delay 212 of RPB 102-1 is out of room for any more incremental adjustment for drift 602. Hence, a switch is made to RPB 102-2, which is sampling at data centers and crossings of data stream 124A. Furthermore, when a data eye adjustable delay 212 of RPB 102-2 subsequently underruns or overruns, as switch back to RPB 102-1 may be performed as such switched to RPB may have been repositioned for sampling with ability to provide additional delay compensation, as described herein.

For example, for drift 602, when RPB 102-1 reaches a maximum delay tap, a swap to RPB 102-2 may be made, where RPB 102-2 is guaranteed to have delay margin for compensation. RPB 102-2 may be continue to be updated in a same direction with the flow of data drift 602, which in the example for drift 602 is incremented.

After switching RPBs 102 of a pair, an RPB 102 of such pair with a current underrun or overrun condition, has data signal and crossing signal swapped. In this example RPB 102-1 would now use crossing signal 115X as a data signal and would now use data signal 115D as a crossing signal. Additionally, updating of such monitor data stream RPB 102-1 of a pair changes direction to move against drift for some period of time after a switch until a lock is found, as previously described. Thus, if data samples and crossing samples have a same data value, a data eye adjustable delay 212 of a monitoring RPB, which in this example is RPB 102-1, is incremented. Likewise, if data samples and crossing samples have a different data values, a data eye adjustable delay 212 of a monitoring RPB, which in this example is RPB 102-1. As data drift 602 continues, a monitoring RPB, which in this example is RPB 102-1, finds a data sample UI centering position. Adjustment of a data eye adjustable delay 212 of a monitoring RPB, which in this example is RPB 102-1, stops being adjusted to move in against the direction as data drift generally after a change of 0.5UI of delay. A change of 0.5UI of delay is generally where a lock to data samples of a data bitstream, namely data bitstream 123A in this example, is obtained.

Once a lock is obtained, adjustment of a data eye adjustable delay 212 of a monitoring RPB 102 of a pair, which in this example is RPB 102-1, may be adjusted to move with the direction of data drift 602. Because a monitoring RPB is data locked to a central position of a data eye, when a live data stream source RPB 102 of a pair reaches a maximum delay location, a switch or handoff to such a monitoring RPB 102 may be performed to have such monitoring RPB 102 be a live data stream source RPB of such pair.

Additionally, a monitoring RPB 102 of a pair reaches a lock state, namely finds X and D samples before a live data stream source RPB 102 of such a pair reaches an adjustment endpoint, such as a maximum delay location in this example, because a live data stream source RPB 102 may be updated at the rate of data drift while a monitoring RPB 102 may be updated at an update loop bandwidth of data communication flow 400. Accordingly, update loop bandwidth is faster than data drift, so a lock condition occurs before such a maximum delay location is reached. Generally, for data drifts 502 and 602, update loop bandwidth of data communication flow 400 has both data streams 123A and 124A of a pair being updated in a direction with an associated data drift before reaching either delay compensation end of a delay chain of a programmably adjustable delay 212 of a live data source RPB.

From the above description, it should be understood that a pair of RPBs 102 provides adjustable delay 212 updates and switching between which RPB 102 of such a pair is a live data source with a built-in locking mechanism to associated data streams which may be used with tight timing tolerances. Additionally, a dual use of a memory interface, such as for example a DDR4 SDRAM PHY, may be provided for a data communication interface, such as for a Gigabit Ethernet and/or PCIe1.x physical layer receiver. More generally, any serial interface that guarantees regular data transitions through data encoding, such as 8b/10b encoding or some other data encoding, may use RPBs 102 as described herein. Along those lines, data conventionally is not encoded with transitions for source synchronous interfaces as such data arrives with a corresponding clock signal. However, for non-source synchronous serial interfaces, data is conventionally encoded with transitions in order to recover a clock from such data stream. As described above, such guaranteed transitions of data may be used to record X and D points and track data drift. Furthermore, it should be understood that locking and tracking as described herein have data track a local clock instead of having a local clock track data (i.e., opposite of clock data recovery).

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 7:
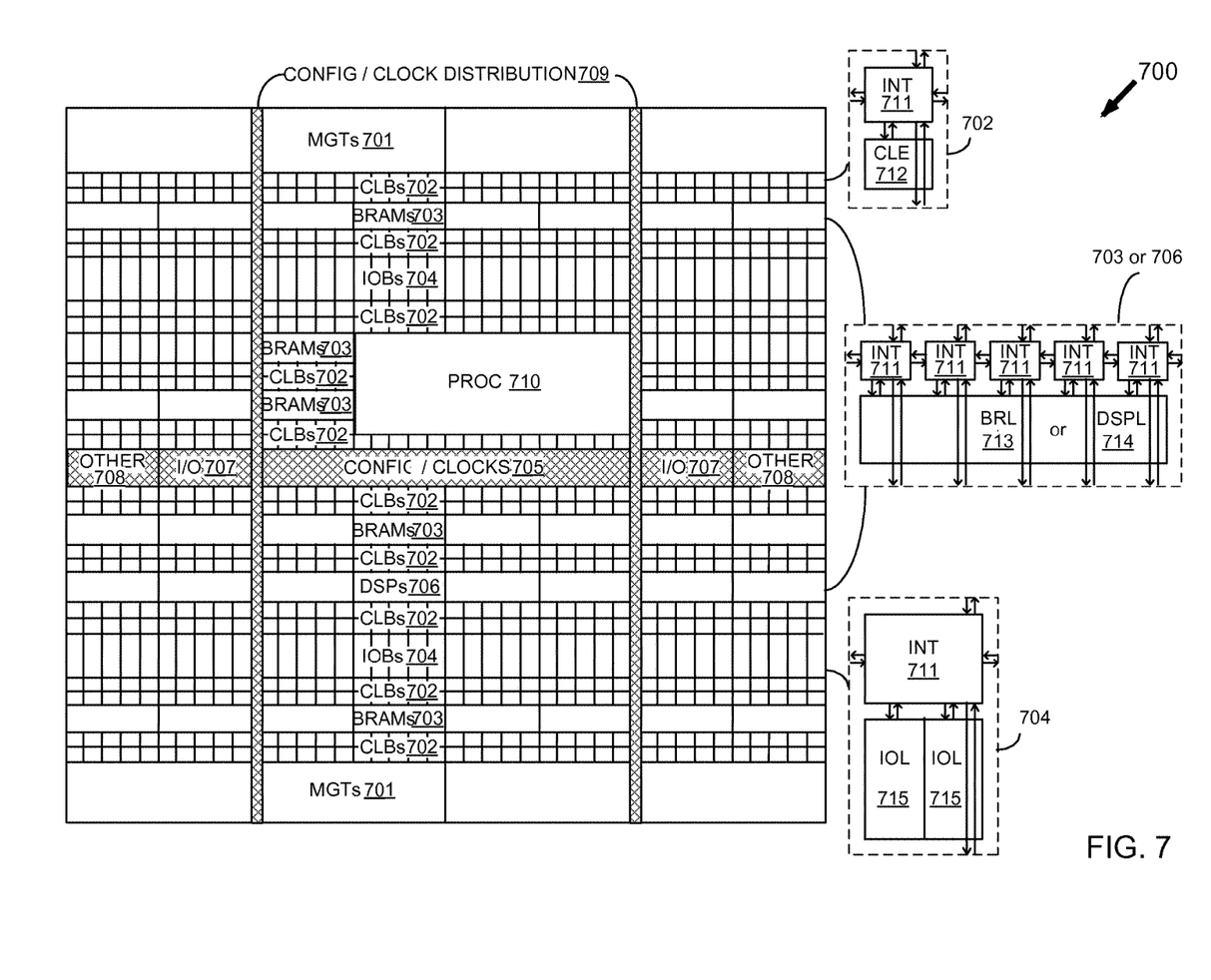
FIG. 7 is a simplified block diagram depicting an exemplary columnar Field Programmable Gate Array ("FPGA") architecture.

As noted above, advanced FPGAs can include several different types of programmable logic blocks in the array. For example, FIG. 7 illustrates an FPGA architecture 700 that includes a large number of different programmable tiles including multi-gigabit transceivers ("MGTs") 701, configurable logic blocks ("CLBs") 702, random access memory blocks ("BRAMs") 703, input/output blocks ("IOBs") 704, configuration and clocking logic ("CONFIG/CLOCKS") 705, digital signal processing blocks ("DSPs") 706, specialized input/output blocks ("I/O") 707 (e.g., configuration ports and clock ports), and other programmable logic 708 such as digital clock managers, analog-to-digital converters, system monitoring logic, and so forth. Some FPGAs also include dedicated processor blocks ("PROC") 710.

In some FPGAs, each programmable tile includes a programmable interconnect element ("INT") 711 having standardized connections to and from a corresponding interconnect element in each adjacent tile. Therefore, the programmable interconnect elements taken together implement the programmable interconnect structure for the illustrated FPGA. The programmable interconnect element 711 also includes the connections to and from the programmable logic element within the same tile, as shown by the examples included at the top of FIG. 7.

For example, a CLB 702 can include a configurable logic element ("CLE") 712 that can be programmed to implement user logic plus a single programmable interconnect element ("INT") 711. A BRAM 703 can include a BRAM logic element ("BRL") 713 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 706 can include a DSP logic element ("DSPL") 714 in addition to an appropriate number of programmable interconnect elements. An 10B 704 can include, for example, two instances of an input/output logic element ("IOL") 715 in addition to one instance of the programmable interconnect element 711. As will be clear to those of skill in the art, the actual I/O pads connected, for example, to the I/O logic element 715 typically are not confined to the area of the input/output logic element 715.

In the pictured embodiment, a horizontal area near the center of the die (shown in FIG. 7) is used for configuration, clock, and other control logic. Vertical columns 709 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, processor block 710 spans several columns of CLBs and BRAMs.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus for communicating data, comprising:
   a first receive path block coupled to receive a first data stream;
   a second receive path block coupled to receive a second data stream associated with the first data stream;
   a clock signal source coupled to provide at least one clock signal to each of the first receive path block and the second receive path block;
   a control block coupled to receive a first output signal pair from the first receive path block and a second output signal pair from the second receive path block;
   wherein the first output signal pair comprises a first crossing signal and a first data signal;
   wherein the second output signal pair comprises a second crossing signal and a second data signal; and
   wherein the control block is configured to provide a first delay adjustment signal to the first receive path block to adjust first delay of the first data stream, and further configured to provide a second delay adjustment signal to the second receive path block to adjust a second delay of the second data stream.

2. The apparatus according to claim 1, wherein the control block is configured to provide a signal pair indicator signal to indicate which of the first signal output pair or the second signal output pair is live and which is monitor.

3. The apparatus according to claim 1, wherein:
   the at least one clock signal comprises a first clock signal and a second clock signal; and
   the second clock signal is an inverted version of the first clock signal.

4. The apparatus according to claim 3, wherein:
   the first receive path block comprises:
      a first data eye adjustable delay coupled to receive the first data stream and the first delay adjustment signal to provide a first delayed data stream;
      a first register coupled to receive the first clock signal and the first delayed data stream to provide the first crossing signal; and
      a second register coupled to receive the second clock signal and the first delayed data stream to provide the first data signal; and
   the second receive path block comprises:
      a second data eye adjustable delay coupled to receive the second data stream and the second delay adjustment signal to provide a second delayed data stream;
      a third register coupled to receive the first clock signal and the second delayed data stream to provide the second data signal; and
      a fourth register coupled to receive the second clock signal and the second delayed data stream to provide the second crossing signal.

5. The apparatus according to claim 1, wherein:
   the first crossing signal is a positive-side crossing signal;
   the first data signal is a negative-side data signal;
   the second data signal is a positive-side data signal; and
   the second crossing signal is a negative-side crossing signal.

6. The apparatus according to claim 5, wherein:
   the first data stream and the second data stream in combination is a differential signal; and
   either the first data stream or the second data stream is inverted to provide the first data stream and the second data stream with a same polarity.

7. A method for communicating data, comprising:
   first updating of a first data eye adjustable delay for a first data stream provided to a first receive data path;
   second updating of a second data eye adjustable delay for a second data stream provided to a second receive data path;
   wherein the first updating and the second updating respectively adjust a first delay of the first data stream and a second delay of the second data stream with respect to at least one clock signal;
   using a first data output of the first receive data path as a live output; and
   using a second data output of the second receive data path as a monitor output.

8. The method according to claim 7, wherein the at least one clock signal comprises a first clock signal and a second clock signal offset in phase with respect to one another.

9. The method according to claim 8, wherein:
   the first updating comprises:
      first sampling with the first clock signal to sample for a data crossing of the first data stream; and
      first sampling with the second clock signal to sample for a data eye interior location of the first data stream; and
   the second updating comprises:
      second sampling with the first clock signal to sample for a data eye interior location of the second data stream; and
      second sampling with the second clock signal to sample for a data crossing of the second data stream.

10. The method according to claim 9, wherein the first delay of the data eye adjustable delay and the second delay of the data eye adjustable delay are offset from one another by a fraction of a unit interval.

11. The method according to claim 9, further comprising:
   reaching either a minimum or maximum delay for the first delay of the first data eye adjustable delay;
   switching from the first receive path to the second receive path;
   using the first data output of the first receive data path as the monitor output; and
   using the second data output of the second receive data path as the live output.

12. The method according to claim 11, wherein:
   the second updating includes either incrementing or decrementing the second delay of the second data eye adjustable delay of the second receive path to be with a direction of drift of the second data stream; and the first updating includes either decrementing or incrementing the first delay of the first data eye adjustable delay of the first receive path to be against the direction of the drift of the first data stream until a lock is obtained.

13. The method according to claim 12, wherein the first updating further includes:

locking to monitor data in the first data stream; and changing from either the decrementing or the incrementing of the first delay of the first data eye adjustable delay of the first receive path to be with the direction of the drift of the first data stream.

14. The method according to claim 9, wherein:

the first sampling with the second clock signal to sample for the data eye interior location of the first data stream is to adjust the first delay of the first data eye adjustable delay of the first receive path to move a first sampling position to a first central location of the first data eye responsive to drift of the first data stream; and the second sampling with the first clock signal to sample for the data eye interior location of the first data stream is to adjust the second delay of the second data eye adjustable delay of the second receive path to move a second sampling position to a second central location of the second data eye responsive to drift of the second data stream.

15. A system for communicating data, comprising:

a plurality of input blocks of an integrated circuit device;

a plurality of receive path blocks respectively coupled to the plurality of input blocks;

wherein the plurality of receive path blocks are of a physical layer interface;

wherein pairs of receive path blocks of the plurality of receive path blocks are coupled to receive differential data inputs;

wherein either a first data stream or a second data stream of a differential data input of the differential data inputs is inverted;

wherein the first data stream is provided to a first receive path block of a pair of the pairs of receive path blocks;

wherein the second data stream is provided to a second receive path block of the pair of the pairs of receive path blocks;

a clock signal source coupled to provide at least one clock signal to each of the first receive path block and the second receive path block;

a control block coupled to receive a first output signal pair from the first receive path block and a second output signal pair from the second receive path block;

wherein the first output signal pair comprises a first crossing signal and a first data signal;

wherein the second output signal pair comprises a second crossing signal and a second data signal; and wherein the control block is configured to provide a first delay adjustment signal to the first receive path block to adjust a first delay of the first data stream, and further configured to provide a second delay adjustment signal to the second receive path block to adjust a second delay of the second data stream.

16. The system according to claim 15, wherein the control block is configured to provide a signal pair indicator signal to indicate which of the first signal output pair or the second signal output pair is live and which is monitor.

17. The system according to claim 15, wherein:

the at least one clock signal comprises a first clock signal and a second clock signal; and the second clock signal is an inverted version of the first clock signal.

18. The system according to claim 17, wherein the differential data input is encoded to ensure transitions.

19. The system according to claim 17, wherein:

the control block is configured to switch between the first receive path block and the second receive path block as a live path and a monitor path for a wraparound between the first delay and the second delay;

the control block is configured to adjust one of the first delay of the first delay adjustment signal and the second delay of the second adjustment signal to be in opposite directions for the wraparound; and the control block is further configured to adjust one of the first delay of the first delay adjustment signal and the second delay of the second adjustment signal to be in a same direction in response to a lock to data on the monitor path.

20. The system according to claim 19, wherein the first receive path block and the second receive path block are delay offset from one another by at least approximately a half of a unit interval.

* * * * *